(12) United States Patent
Katzir et al.

(10) Patent No.: US 7,439,524 B2
(45) Date of Patent: Oct. 21, 2008

(54) THERMOLUMINESCENCE MEASUREMENTS AND DOSIMETRY WITH TEMPERATURE CONTROL OF THE THERMOLUMINESCENCE ELEMENT

(75) Inventors: Abraham Katzir, 15 Him Street, Afeka, Tel Aviv 89696 (IL); Ofer Gayer, Kfar, Yedidia 42940 (IL)

(73) Assignees: Abraham Katzir, Tel-Aviv (IL); Ofer Gayer, Tel-Aviv (IL)

(*) Notice: Subject to any disclaimer, the term of this patent is extended or adjusted under 35 U.S.C. 154(b) by 272 days.

(21) Appl. No.: 11/214,735

(22) Filed: Aug. 31, 2005

(65) Prior Publication Data

US 2006/0043314 A1    Mar. 2, 2006

Related U.S. Application Data

(60) Provisional application No. 60/606,419, filed on Sep. 2, 2004.

(51) Int. Cl.
*H05B 33/00* (2006.01)

(52) U.S. Cl. .................................... 250/484.5

(58) Field of Classification Search ............... 250/484.5
See application file for complete search history.

(56) References Cited

U.S. PATENT DOCUMENTS

| | | | |
|---|---|---|---|
| 3,531,641 A | 9/1970 | Weissenberg | |
| 3,729,630 A | 4/1973 | Yamashita | |
| 3,790,784 A | 2/1974 | Webb et al. | |
| 3,809,901 A | 5/1974 | Szalanczy et al. | |
| 3,975,637 A | 8/1976 | Ikedo | |
| 4,204,119 A | 5/1980 | Yasuno | |
| 4,638,163 A | 1/1987 | Braunlich | |
| 4,835,388 A | 5/1989 | Bruml | |
| 4,839,518 A | 6/1989 | Braunlich | |
| 4,906,848 A | 3/1990 | Braunlich et al. | |
| 5,041,734 A | 8/1991 | Tetzlaff | |
| 5,081,363 A | 1/1992 | Tetzlaff | |
| 5,606,163 A | 2/1997 | Huston | |
| 6,005,231 A | 12/1999 | Lanovich | |
| 6,414,324 B1 | 7/2002 | Colyott | |
| 2006/0050766 A1* | 3/2006 | Hollander et al. | ........... 374/121 |

OTHER PUBLICATIONS

"Fiber-optic infrared radiometer for accurate Temperature Measurements" Sade et al Applied Optics / vol. 41. No. 10 pp. 1908-1914 Apr. 2002.

* cited by examiner

*Primary Examiner*—David P. Porta
*Assistant Examiner*—Marcus H Taningco
(74) *Attorney, Agent, or Firm*—Mark M. Friedman (57) ABSTRACT

A thermoluminescence (TL) dosimetry (TLD) system comprises at least one TLD element that is controllably heated and which temperature is monitored in real time using an infrared (IR) radiometry subsystem that provides respective IR radiation inputs to a control subsystem. The control subsystem uses the inputs to effect the heating control. The TLD system further comprises a TL measuring subsystem for measuring TL emission data from each heated TLD element, the TL data used in obtaining a does curve indicative of the total radiation to which the TLD element has been exposed.

23 Claims, 8 Drawing Sheets

THERMOLUMINESCENCE MEASUREMENTS AND DOSIMETRY WITH TEMPERATURE CONTROL OF THE THERMOLUMINESCENCE ELEMENT

CROSS REFERENCE TO RELATED APPLICATIONS

The present application claims the benefit of priority from U.S. patent application No. 60/606,419 filed Sep. 2, 2004, the contents of which are incorporated herein by reference.

FIELD OF THE INVENTION

The present invention relates generally to dosimeter systems for monitoring radiation from such radiation sources as ultraviolet, X-ray radiation, gamma radiation, beta radiation, and neutrons, and more particularly to thermoluminescence measurements and dosimetry.

BACKGROUND OF THE INVENTION

Radiation dosimeters, which measure the dose of incident radiation to which people, animals, plants or inanimate objects are exposed, are known. Dosimeters have been used in prior art for personal and environmental monitoring, for medical research and for radiation therapy. Of particular interest are small dosimeters, which are worn as personal badges and which need to be reliable and accurate, especially for measurements of low radiation doses. Some of these dosimeters are based on disposable photographic films. Others are non-disposable, such as those based on optically stimulated luminescence. Thermoluminescent dosimeters are among the most important non-disposable personal dosimeters, and may be used for example for in vivo and environmental dosimetry.

Thermoluminescence (TL) is a physical phenomenon exhibited in materials which are irradiated with energetic radiation and subsequently stimulated, using heat, to produce luminescent emission. When thermoluminescent materials are exposed to a flux of electromagnetic radiation such as gamma rays, X-rays or UV rays, to charged particles such as beta rays, to uncharged particles such as neutrons, or to other forms of radiation, electrons within the material are excited from low energy levels to relatively stable traps at higher energy levels. The electrons may stay at these higher energy levels for a long period of time. If the material is heated, the added energy releases the trapped electrons, causing them to fall back to the lower energy levels. This fall is accompanied by the emission of a luminescent emission, i.e. thermoluminescence.

When a thermoluminescent element is heated from some low temperature $T_0$ to some high temperature (e.g. 400° C.) the intensity of the luminescence increases at first (when more electrons in the traps are released) and then decreases (when the number of trapped electrons decreases). This gives rise to a peak in the luminescence, which appears at a certain temperature. If there are several types of traps, several peaks are observed at different temperatures. The graph of the luminescence intensity as a function of temperature is called a "glow curve". The heights of the peaks (or the integrated area under the glow curve) are found to depend on the radiation exposure dose. In a simple case, the dependence may be linear, which allows the dose to be obtained from a measurement of the glow curve, after a proper calibration. This is the principle of thermoluminescence dosimetry (TLD).

One application of TLD is to monitor radiation exposures of personnel such as medical personnel exposed to X-rays. Each person is required to carry a dosimeter called a "TLD badge." The badge may comprise more than one TLD element. The badge is assumed to receive the same dose as the carrying person. Periodically, the badges are processed to obtain an exposure record for each person being monitored.

If glow curve measurements are carried out on TLD elements, reliable results are obtained only when each of these elements is heated in a controllable and reproducible fashion (i.e. using the same initial and final temperatures and the same variation of temperature with time). The most desirable way is to heat the elements linearly, so that for each element the temperature follows the formula $T_{el}=T_0+\alpha t$, where $T_0$ is the initial temperature, $T_{el}$ is the temperature of the sample at time t, and $\alpha$ is the heating rate. It is advantageous to heat the samples as fast as possible, since in this case the glow peaks are sharp and easy to measure, and more samples can be measured in a given time period.

Different materials have been used for TL dosimetry (and for making TLD elements). These include $Na_2SO_4$, $MgSO_4$, $Y_2O_3$, $Al_2O_3$, $CaF_2$, $SrF_2$ and $BaF_2$, doped materials, such as $CaSO_4$:Tm, $CaF_2$:Mn, $Al_2O_3$:C, LiF:Cu, Mg, Pr, as well as many other materials. The TLD elements are normally made from single crystals, from pressed powders, from thin layers deposited on substrates, from small particles embedded in glass or in polymers, etc. In some cases the elements are exposed (uncased) during the TL measurement. In other cases each element is placed within a tiny plastic bag, which is part of the personal badge, so that the heating and the luminescence measurements can be carried out without removing the element from the plastic bag. The TLD elements may have different geometrical shapes, e.g. plates, discs, rods, pellets, fibers, etc.

Several methods have been used in the past for heating the TLD elements:

(a) Contact Heating—the element is heated by a tiny heater placed in close contact and whose temperature is controlled. The heating in this case is highly non-uniform and relatively slow. Also, the results are non-reproducible, because the temperature of the element depends on the contact between the element and the heater.

(b) Hot Gas Heating—the element is heated by a stream of hot gas, whose temperature its controlled. This method provides more uniform and faster heating, but the whole system is much more complicated and expensive.

(c) Heating by Incandescent Lamps—in this case the heating depends on the absorption of radiation emitted from an incandescent source in the element or in the substrate on which the element is placed. The reproducibility of this method is insufficient, and (especially with substrate heating) the heating rate is also insufficient.

(d) Laser Heating—in some cases the laser radiation may be directly absorbed by the TLD element. In other cases, the laser radiation is absorbed in a matrix (e.g. glass or polymer) embedding small particles of the TL material. The laser heats the matrix, which in turn heats the particles. In most cases the laser power is monitored and it is assumed that a given power generates a predetermined temperature increase. The main problem with this method is that the laser power changes with time and its distribution is non-uniform. This may lead to distorted glow cures and to inaccurate results.

(e) Rapid Heating by Light—in this case an energetic pulse from a laser (or from an incandescent light source) rapidly heats the TL element. The intensity of the emitted luminescence is very high and easy to measure. The main disadvantage of this method is in the very limited control of the heating process, which leads to non-reproducible glow curves.

(f) RF Heating: TLD elements are bonded to graphite plates and heated by induction, using a radio frequency (RF) generator. As in (e), the heating control is difficult and the resulting glow curves may be non-reproducible.

Exemplary methods and systems may be found in a number of prior art publications, for example in U.S. Pat. Nos. 3,531,641, 3,729,630, 3,975,637, 4,204,119, 4,638,163, 4,835,388, 4,839,518, 5,041,734, 5,081,363, 5,606,163, 6,005,231 and 6,414,324. None of these methods and systems measures the temperature of the TLD element in real time to enable accurate control of the TLD heating rate. For example, U.S. Pat. No. 6,005,231 discloses a method and apparatus for measuring radiation doses based upon thermoluminescence. A heat energy sensor is provided for the heat source for detecting the heat energy output from the heat source toward the element. The temperature of the element is calculated on the basis of the detected heat energy. The calculated temperature is used to determine if remedial action is necessary. For instance, the calculated temperature may be compared with a predetermined optimum heating temperature. If the calculated temperature deviates from the predetermined optimum heating temperature, responsive action is taken. A temperature increase rate may also be calculated. The calculated increase rate would be compared with a predetermined heating rate. The heating device would increase its heat energy output if the calculated increase rate is lower than the predetermined heating rate and decrease the heat energy if the calculated increase rate is higher than the predetermined heating rate. In summary, the inventors do not measure directly the temperature of the TLD element, and in fact state that it is almost impossible to measure the temperature of the TLD element during heating.

All mentioned prior art methods assume that the temperature $T_{el}$ of the TLD element itself should increase reproducibly during the heating phase. Theoretically, the most convenient heating scheme is that in which the temperature increases linearly with time. However, $T_{el}$ is not directly controlled in any of these methods. In some cases, a thermocouple may be placed in contact with the TLD element to provide a $T_{el}$ measurement. However, since the physical contact between thermocouple and TLD element may vary between elements and may change in time for the same element, such temperature measurements are inaccurate. This remains a common problem in all TLD systems. Consequently, even if the heating source behaves reproducibly, the real heating rate of the TLD elements may not be reproducible.

The temperature $T_{el}$ of the TLD element can be determined by measuring the thermal infrared radiation emitted from its surface. The intensity I of the radiation emitted from a surface area A is given by the expression $I = A\epsilon\sigma T^4$, where $\epsilon$ is the emissivity of the element and $\sigma$ is the Stephan-Boltzmann constant. The spectral distribution of thermal radiation is derived from Planck's black body theory. The dependence of the wavelength $\lambda_{max}$ at which a black body emits at maximum intensity on its temperature is known as Wien's displacement law: $\lambda_{max} T = 2898$ μmK. Therefore, most of the thermal radiation of a body near room temperature (T≈300° K) is in the middle infrared (mid-IR) in the spectral range 3-30 μm. This radiation can be easily measured by infrared detectors, which may exemplarily be thermal detectors, such as pyroelectric, thermoresistive and MEMS devices, many of whom operate at room temperature, or photonic (i.e. quantum) detectors such as HgCdTe, many of whom are cooled by liquid nitrogen or thermoelectrically. This method of infrared radiometry therefore serves for infrared thermometry.

The mid-IR radiation emitted from the surface of the TLD element can be collected and focused on the infrared detector using standard optical elements, such as mirrors or lenses. The emitted mid-IR radiation can also be carried through infrared transmitting optical fibers, only a few of which are transparent in the mid-IR range. Optical fibers made of silver halides are among the best candidates for that purpose. They are highly transparent in the mid-infrared, in the spectral range 3-30 μm, with losses of about 0.2 dB/m at 10.6 μm.

IR temperature measurements based on detection of IR radiation emitted by a heated body are known, see e.g. Remote IR sensing of temperature, including through the use of fibers that conduct the IR radiation to a detector, is also known, see e.g. S. Sade, O. Eyal, V. Scharf and A. Katzir, "Fiberoptic Infrared Radiometer for Accurate Temperature Measurements," Applied Optics, Vol. 41, no. 10, pp. 1908-1914 (2002). However, the use of such measurements for determining the temperature of a TLD element in real-time, and the use of this data (temperature readings) in close loop control of the heating of the element is unknown.

In conclusion, all prior art methods are disadvantageous in that the temperature of the TLD elements is not well monitored and controlled and the heating of such elements is generally not well controlled. Consequently, glow curves suffer from irreproducibility and so do dosimetry results. There is therefore a widely recognized need for, and it would be highly advantageous to have a TLD measurement system and method in which the temperature and heating rate of each TLD element is known and controllable in real-time.

SUMMARY OF THE INVENTION

A main object of the present invention is to provide a thermoluminescent measurement system, which is based on heating of the TLD elements under tight temperature control.

Another object of the invention is to facilitate the use of the above-mentioned TL system for dosimetry, to be used for personal monitoring, for environmental monitoring, and for radiation therapy.

A system of the present invention includes a TLD element that stores energy when exposed to ionizing radiation, and releases the energy in the form of luminescent light when heated. In some embodiments, the system includes a laser whose energy is used to heat the element. In other embodiments, the heat is provided by a non-laser heating source. The heated element emits radiation in two spectral ranges: thermal infrared (IR) radiation, whose intensity is determined by the temperature of the element, and visible (or near-infrared or UV) luminescence. The system further includes an IR radiometer (i.e. thermometer), which measures the emitted thermal infrared radiation, and generates a signal which is measured by known means, e.g. a computer. A computer program or similar analyzing means uses the signal to determine the temperature of the element and to control the laser power so that a desirable temperature is obtained. The computer program can vary the temperature as a function of time. The rapid response of the system makes it possible to control the heating rate of the element and to generate a desired heating scheme, such as linear heating or exponential heating. The system also includes a photodetector for measuring the luminescence emitted during the heating of the element. The signal generated by the photodetector is also measured by the computer, and a plot of the emitted intensity as a function of the temperature (i.e. a glow curve) is obtained. The computer program analyses the glow curve and determines the total radiation dose to which the element had been exposed.

The system and method disclosed herein facilitate TL measurements under tight temperature control of the TLD element itself (for example using a laser beam). This makes it possible to heat the elements linearly, even with a fast heating rate. The measurement of the glow curve is therefore fast, accurate and reproducible. This, in turn, provides highly accurate and reliable thermoluminescence dosimetry.

According to the present invention there is provided a thermoluminescence-based dosimetry system comprising at least one TLD element operative to be heated controllably and to emit luminescence during the heating, the emitted luminescence correlated with a radiation dose to which the TLD element has been exposed and an IR radiometry subsystem for monitoring IR radiation emitted from each TLD element during the heating and for providing respective IR radiation inputs used in the controllable heating According to the present invention, the system further comprises a heating subsystem for providing the controllable heating of each TLD element, a TL measuring subsystem for measuring the emitted luminescence, and for providing luminescence data, and a control subsystem for controlling heating parameters of the heating subsystem in response to the IR radiation inputs and for providing at least one glow curve based on the luminescence data, the glow curve indicative of the radiation dose.

According to yet another feature in the system of the present invention, the IR radiometry subsystem includes at least one IR detector, which is selected from the group consisting of a thermal detector and a photonic detector.

According to yet another feature in the system of the present invention, the heating system includes a laser with a laser beam.

According to yet another feature in the system of the present invention, the laser is selected from the group consisting of a pulsed laser, continuous wave gas laser, solid-state laser and semiconductor laser.

According to yet another feature in the system of the present invention, the heating parameters include a controllable linear heating rate.

According to yet another feature in the system of the present invention, the IR radiometry subsystem further includes an IR-transparent filter that blocks visible, near infrared (NIR) and UV radiation positioned between the IR detector and each TLD element.

According to yet another feature in the system of the present invention, the TL measuring subsystem includes an optical filter transparent to the luminescence and opaque to IR radiation positioned between the TL detector and the TLD element.

According to yet another feature in the system of the present invention, the heating system further includes at least one optical fiber coupled to the laser and operative to transmit the laser beam to each TLD element.

According to yet another feature in the system of the present invention, the IR radiometry subsystem further includes an IR-transparent and visible radiation blocking optical fiber for coupling the IR detector to each TLD element.

According to yet another feature in the system of the present invention, the IR radiometry subsystem further includes an IR-transparent optical fiber and a visible radiation-blocking filter for coupling the IR detector to each TLD element.

According to yet another feature in the system of the present invention, the TL measuring subsystem includes an optical fiber transparent to the luminescence and opaque to IR radiation, the fiber coupled to a TL detector.

According to yet another feature in the system of the present invention, the TL measuring subsystem includes a TL detector, an optical fiber transparent to the luminescence and used to transfer the luminescence to the TL detector, and an IR radiation-blocking filter interposed the optical fiber and each TLD element.

According to yet another feature in the system of the present invention, the control subsystem includes a computer program operative to convert the luminescence data into the glow curve.

According to yet another feature in the system of the present invention, each of the heating, IR radiometry and TL measuring subsystems includes at least one respective optical fiber for coupling respective radiation into and out of the at least one TLD element.

According to yet another feature in the system of the present invention, all the respective optical fibers are bundled in one enclosure.

According to yet another feature in the system of the present invention, the enclosure is selected from the group consisting of a hypodermic needle, a catheter and a tube.

According to the present invention there is provided a TL-based dosimetry system comprising: at least one TLD element operative to be heated controllably and to emit luminescence during the heating; a laser for effecting the heating; an infrared detector for monitoring IR radiation emitted from each TLD element during the heating and for providing respective IR radiation inputs used in the controllable heating; a TL detector for obtaining luminescence readings, the luminescence readings correlated with a radiation dose to which the element has been exposed; and a controller for controlling the laser based on the IR radiation inputs, thereby facilitating the controllable heating of each TLD element According to one feature in the system of the present invention, the laser, the IR detector and the TL detector are optically coupled to each TLD element through at least one respective optical fiber.

According to the present invention there is provided a method for performing TL-based dosimetry comprising the steps of: exposing a TLD element to an unknown dose of radiation, heating the TLD element at a controlled rate based on real-time temperature inputs from the TLD element, performing TL measurements on the heated TLD element to obtain a glow curve and analyzing the glow curve to determine the radiation dose to which the element was exposed.

According to the present invention, in some embodiments of the method, the step of exposing is preceded by a step of annealing the TLD element at a high temperature to erase any memory from previous measurements.

According to one feature in the method of the present invention, the step of heating includes heating using a laser.

According to another feature in the method of the present invention, the step of performing TL measurements and the obtaining of IR temperature readings includes using respective optical fibers to respectively transmit laser radiation, TL emission radiation and IR radiation, thereby allowing remote thermoluminecence-based dosimetry.

According to yet another feature in the method of the present invention, the using of respective optical includes bundling the optical fibers in an enclosure.

BRIEF DESCRIPTION OF THE DRAWINGS

For a better understanding of the present invention and to show more clearly how it could be applied, reference will now be made, by way of example only, to the accompanying drawings in which:

FIG. 2(A-C) shows schematically various mechanical holders of the TLD element of the invention;

FIG. 4 shows schematically (A) in cross section and (B) in plane view a badge that contains four TLD elements;

FIG. 6(A-C) illustrates alternative embodiments of the TLD system of the present invention for in vivo radiation monitoring of radiation doses in a patient undergoing radiation therapy;

DETAILED DESCRIPTION OF THE PREFERRED EMBODIMENTS

The present invention discloses, in various embodiments, a TLD system comprising at least one TLD element that can be controllably heated, its temperature monitored in real-time using infrared (IR) radiometry. The radiometry readings are fed into a control subsystem that provides control commands to a heating subsystem, which heats the TLD element with no physical contact. The TLD system further comprises a TL measuring subsystem for measuring TL emission data from each heated TLD element, the TL data used in obtaining a glow curve indicative of the total radiation to which the TLD element has been exposed.

Figure 1:
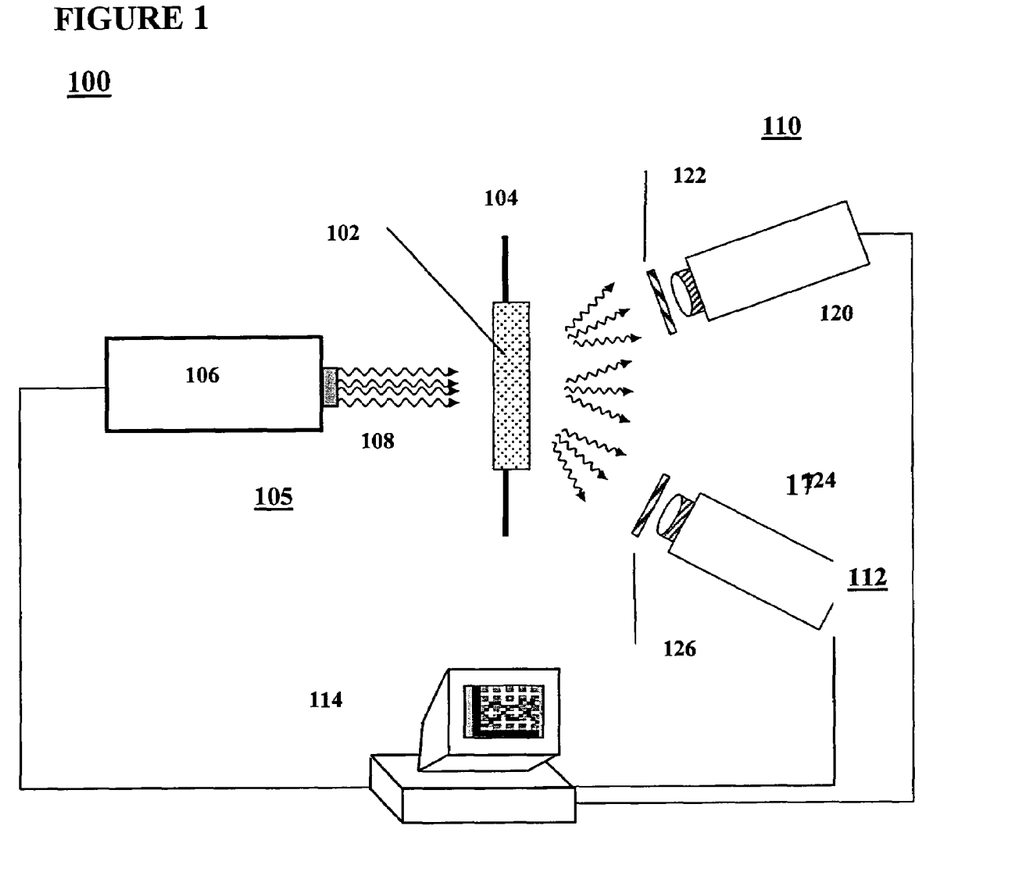
FIG. 1 is a schematic diagram of a laser-heated, temperature controlled TLD system of the present invention.

FIG. 1 shows schematically a temperature controlled TL system 100 of the invention. System 100 comprises at least one TLD element 102, which stores energy when exposed to ionizing radiation; a mechanical holder 104 for holding TLD element 102; a heating subsystem 105 (preferably a laser source 106 emitting a laser beam 108 along an optical path to the TLD element) for heating the TLD element; an infrared (IR) radiometry (i.e. thermometer) subsystem 110 for monitoring the thermal (IR) radiation emitted from the heated element, thereby determining the temperature of the element; an optical detection subsystem 112 for measuring the (visible or NIR or UV) emitted from the TLD element during heating, and a controlling subsystem (or simply "controller") 114 for using the IR radiation data from subsystem 110 to provide control commands to laser source 106, for plotting the emitted glow curve (emitted intensity I as a function of the temperature $T_{el}$ of the element) and for determining the total dose to which the element had been exposed prior to the TL measurement.

Subsystem 110 preferably comprises an IR detector 120 in optical communication along an optical path with the TLD element, in front of which there may be placed a filter. 122 that transmits IR radiation, but does not transmit UV, visible or NIR radiation. Subsystem 112 preferably comprises a photodetector (PD) or a photomultiplier 124 in optical communication along an optical path with the TLD element, in front of which there may be placed a filter 126 that transmits UV, visible and NIR light, but not middle-infrared (mid-IR) radiation. It is understood that the filters may be inserted in the relevant optical paths at various positions, as long as they achieve the required function of transmitting a required radiation and blocking other types of radiation. Controller 114 is typically a personal computer running a special program for controlling the heating rate of the TLD element. Other types of controllers capable of control and analysis functions may also be used. Note that while system 100 is shown with the heat source heating only one side of TLD element 102, with the two detectors placed on the opposite side, other configurations are possible and are to be considered within the scope of the present invention. In some embodiments, system 100 may incorporate several TLD elements, which are measured either simultaneously or sequentially. In some embodiments, the functions of IR reading and TL measurements may be combined in one subsystem. While the invention is described in detail with reference to a laser based heating subsystem, it should be clear that many other heating systems and methods, including all those mentioned in the Background may be used for heating the TLD element.

A TLD element 102 may be made of any material and in any shape mentioned in the Background section and more. In many of the applications it would be desirable to heat the TLD element linearly (or exponentially) at a very rapid rate. Therefore it is desirable that the TLD element has a small mass and be held by a mechanical holder that provides good thermal insulation from the surroundings. Preferably, the TLD element is in the shape of a thin plate or a thin rod. Preferably, mechanical holder 104 comprises one or more holding elements in the form of thin wires, thin springs, or thin needles, to minimize thermal losses to the surroundings. A few exemplary holders 104 are shown in FIG. 2.

Figure 2A:
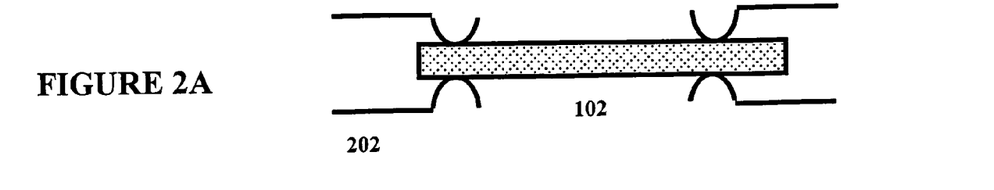
Figure 2B:
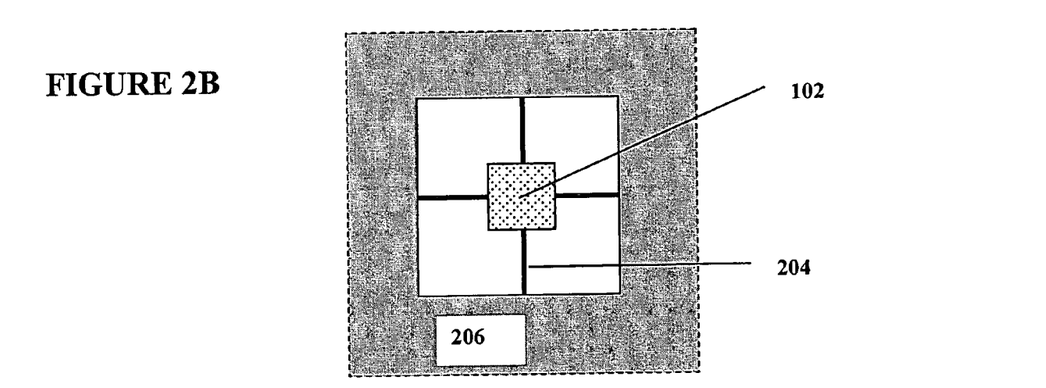
Figure 2C:
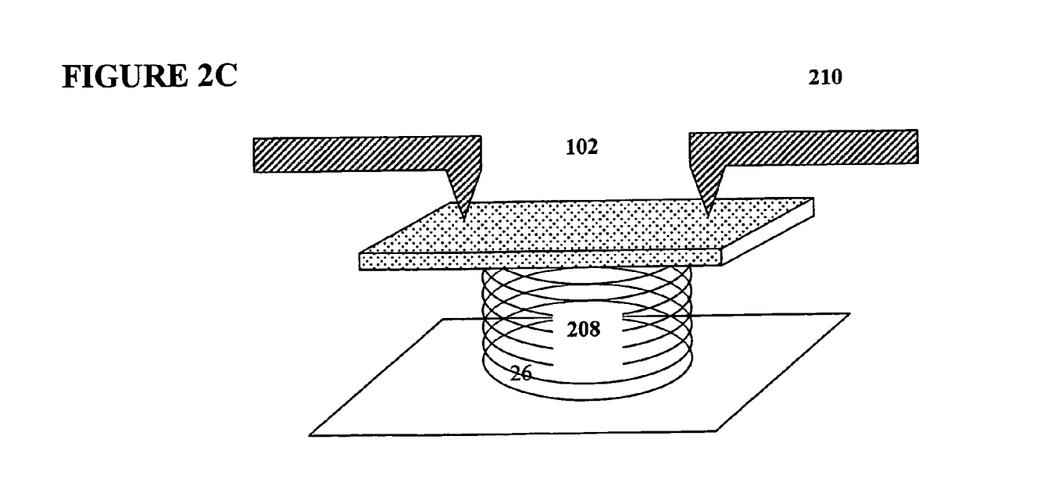

FIG. 2A shows a thin plate TLD element 102 held between four springs 202. FIG. 2B shows a thin plate TLD element 102 held by four fine wires 204 to a frame 206. FIG. 2C shows a thin plate TLD element 102 pressed by a thin spring 208 to sharp tipped wires 210. It is to be understood that while identical holding elements may be preferable for uniform heat conduction, non-identical holding elements may be useful in certain applications. The number of "four" is also illustrative: less or more than four holding elements may be used for the purposes set forth herein.

Many types of lasers can be used as laser source 106, including pulsed or CW gas lasers, solid-state lasers or semiconductor lasers. Many of the TLD elements absorb radiation strongly in the mid-IR range. In some embodiments, a $CO_2$ laser with emission at 10.6 μm may be used for heating most TLD elements, including those deposited on an opaque substrate, or covered with an opaque material. In other embodiments, a semiconductor laser may be used for heating TLD elements based on powders embedded in a glass that absorbs the radiation emitted by the semiconductor laser. The laser beam may impinge directly on the TLD element, may be directed onto the element using standard mirrors or lenses, or may be transmitted via suitable optical fibers that are transparent to the laser wavelength, as described in more detail in a specific example below.

The temperature $T_{el}$ of the TLD element is determined by monitoring the thermal infrared radiation emitted from this element, as mentioned above. For many of the TLD elements used, one may assume that $\epsilon=1$ and that it does not vary with temperature. If the emissivity is different from 1, then one may calibrate the system and obtain the "true" $T_{el}$ of the element (irrespective of the emissivity).

As mentioned, it is often desirable to heat the sample linearly, with $T_{el}=T_0+\alpha t$. With such linear heating the interpretation of the thermoluminescence results is made much simpler. The computer program in PC 114 can continuously increase or decrease the laser power heating the TLD element, so that the temperature varies linearly with time until it reaches some final temperature. One can select faster or slower heating rates, non-linear heating schemes, as well as various final temperatures.

The laser system discussed above provides very fast monitoring and control, which is not available in other TL systems. This is the result of several factors: (a) IR radiometry provides accurate and very fast measurement of the temperature of the element; (b) the laser power can be changed very rapidly, in response to signals from the computer; (c) the heating of a TLD element by a laser (especially for thin TLD elements) is very fast. This is the reason the system can provide fast heating at a linear rate. It must be stressed that although the heating is fast, the system of this invention controls the temperature and the heating rate during the TL measurement process—something that other systems do not do.

PD subsystem 112 measures the thermoluminescence emitted by the TLD element (often visible luminescence) upon being heated. The emitted TL may be collected and focused on the PD using regular optical elements such as mirrors or lenses. It may also be transmitted from the heated element onto the PD using standard optical fibers, made of silica or polymers. The signal from the PD may be amplified and transmitted to the computer for use in the calculation of the glow curve.

Thermoluminescence Dosimetry

Each TLD system, including the one discussed in this invention, can be calibrated. During the calibration step, TLD elements are exposed to known doses of radiation, and for each dose a glow curve is measured. One can then get a calibration curve, which correlates between the dose and the height of the glow curve peaks or the integrated area under the glow curve. When this calibration curve is available, the computer program can analyze a given glow curve and determine the exact dose to which a TLD element had been exposed. The system of the invention is also operative to anneal the TLD elements after a dosimetry measurement, i.e. heat the TLD element to some high temperature (e.g. 400C), or even generate several heating cycles using the laser source. The annealing is also fast and well controlled. This annealing eliminates any "memory" effects of a previous exposure. This is important, in order to get accurate results.

Fiberoptic System

Figure 3A:
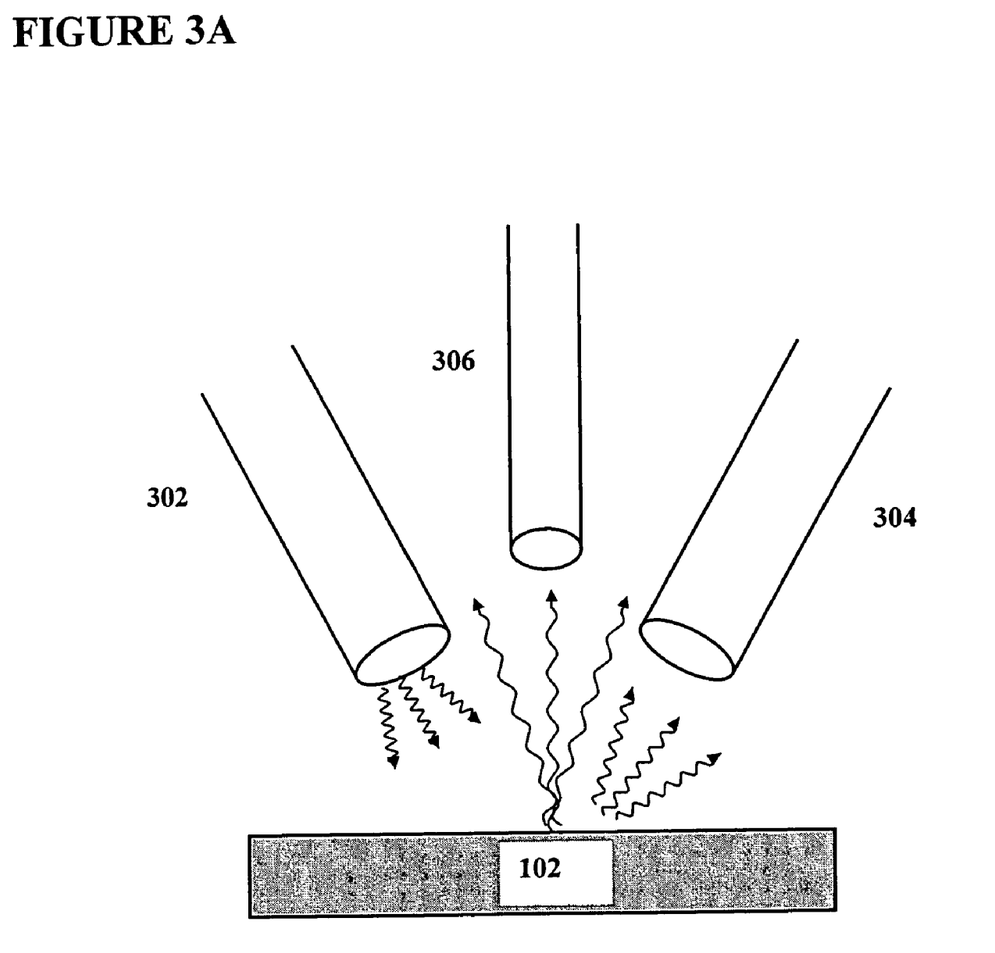
FIG. 3A shows an embodiment of the system of the present invention based on optical fibers.
Figure 3B:
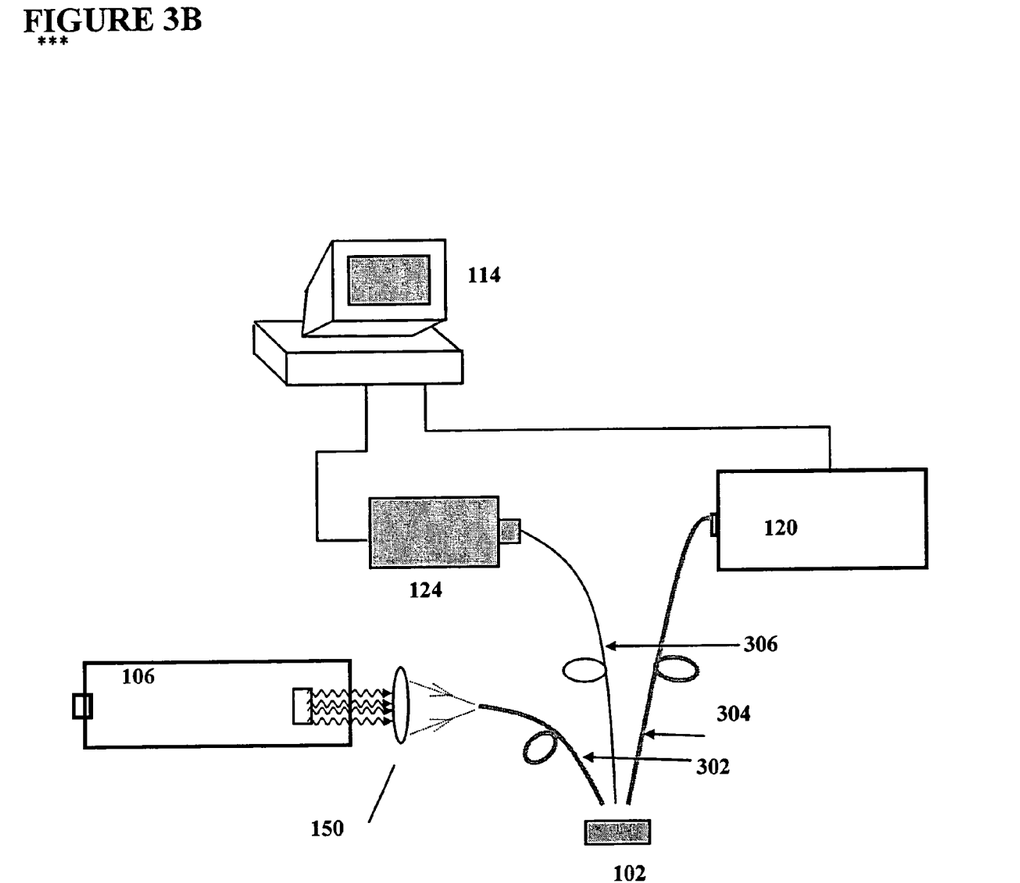
FIG. 3B shows a TLD system as in FIG. 1, with optical fibers for guiding light and infrared radiation.

FIGS. 3A,B shows an embodiment of the system of the present invention based on optical fibers. FIG. 3A shows a schematic arrangement of three optical fibers 302, 304 and 306 in optical communication with a TLD element 102. FIG. 3B shows the fibers incorporated in a system similar to system 100 of FIG. 1. One fiber is used for heating the TLD element, one for monitoring the temperature of the TLD element, and one for measuring the luminescence emission from the TLD element. Exemplarily, in FIGS. 3A, B, the laser beam is transmitted through fiber 302. Fiber 302 is chosen to transmit efficiently the laser radiation, which may be coupled into the fiber through a couling element (e.g. lens) 150. Fiber 304 is an IR fiber that transmits the thermal IR radiation emitted from the TLD element to IR detector 120, and may optionally serve as a filter that blocks UV, visible and NIR radiation from the IR detector. Fiber 306 transmits the TL emission from the TLD element to PD 124. This fiber is normally made of silica based glass or on some polymer transparent to visible light, and may optionally also serve as a filter, which transmits only UV, visible and NIR radiation, but blocks the thermal (mid-IR) radiation to the PD. PC 114 fulfills the same functions as described with reference to FIG. 1.

The arrangement (e.g. bundle) of three fibers, shown in FIGS. 3A, B, may also be used for TL measurement in a remote location. In alternative embodiments, a fiber based-TLD measurement systems of the present invention may be based on less or more than 3 fibers, with one or more fibers implementing more than one function.

Multiple TLD Elements

Figure 4A:
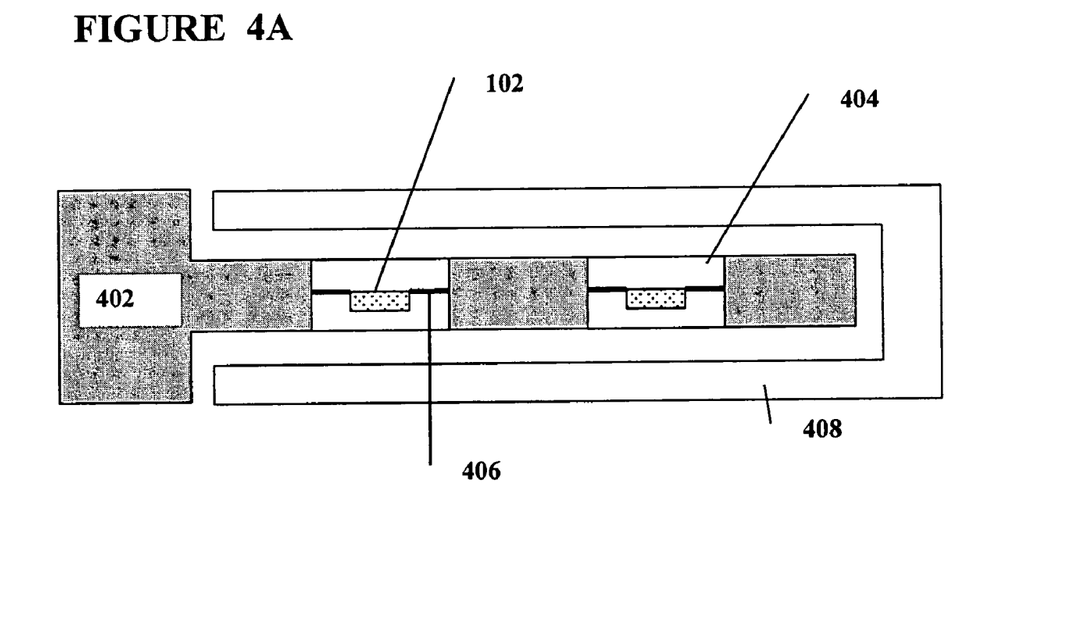
Figure 4B:
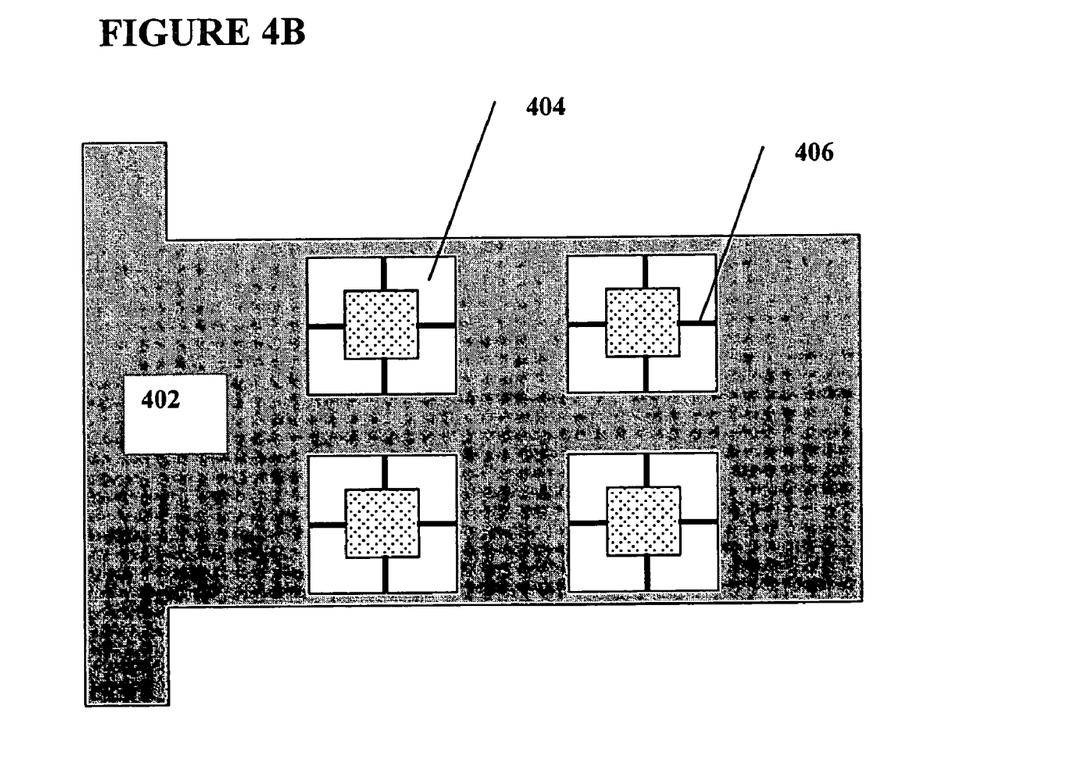
Figure 5:
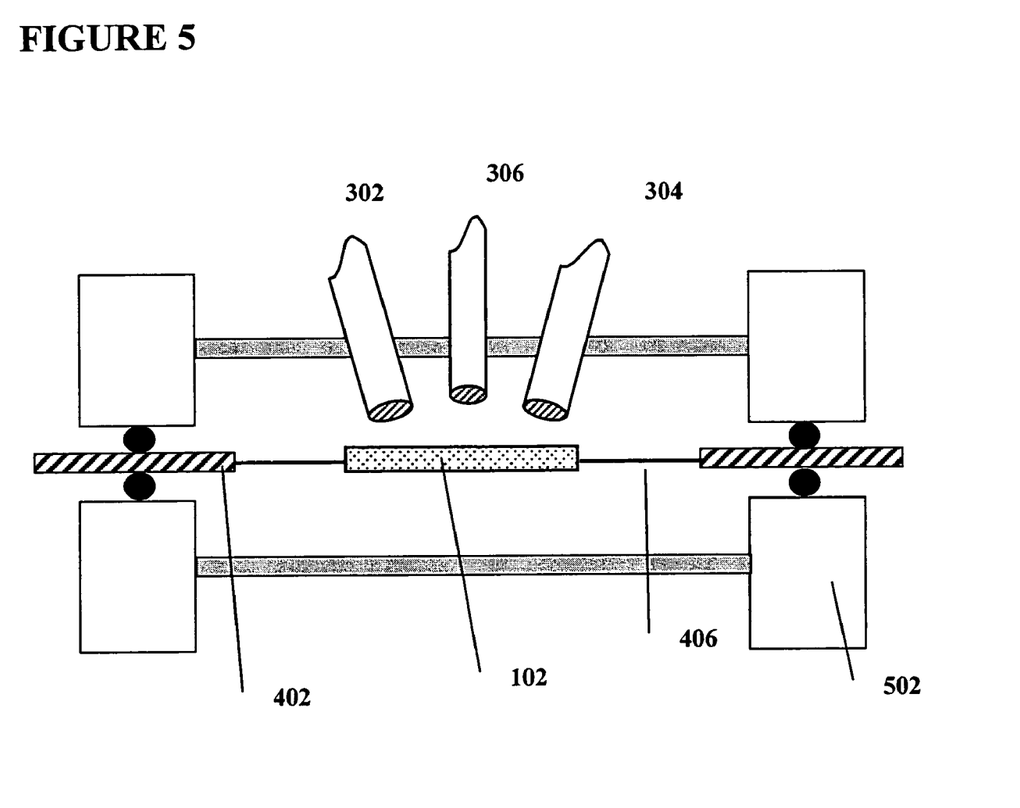
FIG. 5 is a schematic drawing of a measurement setup for a TLD element heated under vacuum, using the scheme of FIG. 3A.

In some embodiments, the system of the present invention may be used in applications that require more than one TLD element. For example, badges worn by personnel in the vicinity of a radiation source may include several TLD elements. FIG. 4 shows schematically (A) in cross section and (B) in plane view a badge with four TLD elements. The badge comprises a card 402 with four openings 404, each opening housing a thin TLD element 102 held by four thin wires 406. The card is inserted into a cassette 408, which is worn as a badge, and (if needed) the card can be pulled out for the TL measurement. Exemplarily, each or only some of the TLD elements in the badge may be measured by the system, using for example the 3-fiber arrangement of FIG. 3. One may, for example, measure two of the elements, in order to get more accurate results, and leave two elements untouched for future reference Measurements under Vacuum Faster heating rates are obtained if the heating of the TLD element is done under vacuum. FIG. 5 is a schematic drawing of a measurement setup for a TLD element heated under vacuum, using the scheme of FIG. 3. Card 402 may be inserted in a vacuum chamber 502 shown schematically in FIG. 5. The TL measurements may also be done using standard optical elements such as mirrors, lenses, or windows, but it is much preferable to use optical fibers in this case. The bundle of three fibers may be inserted into the vacuum chamber, through suitable ports, and the whole TL measurement can be carried out under vacuum. More than one TLD element may be measured, as discussed with reference to FIG. 4.

Figure 6A:
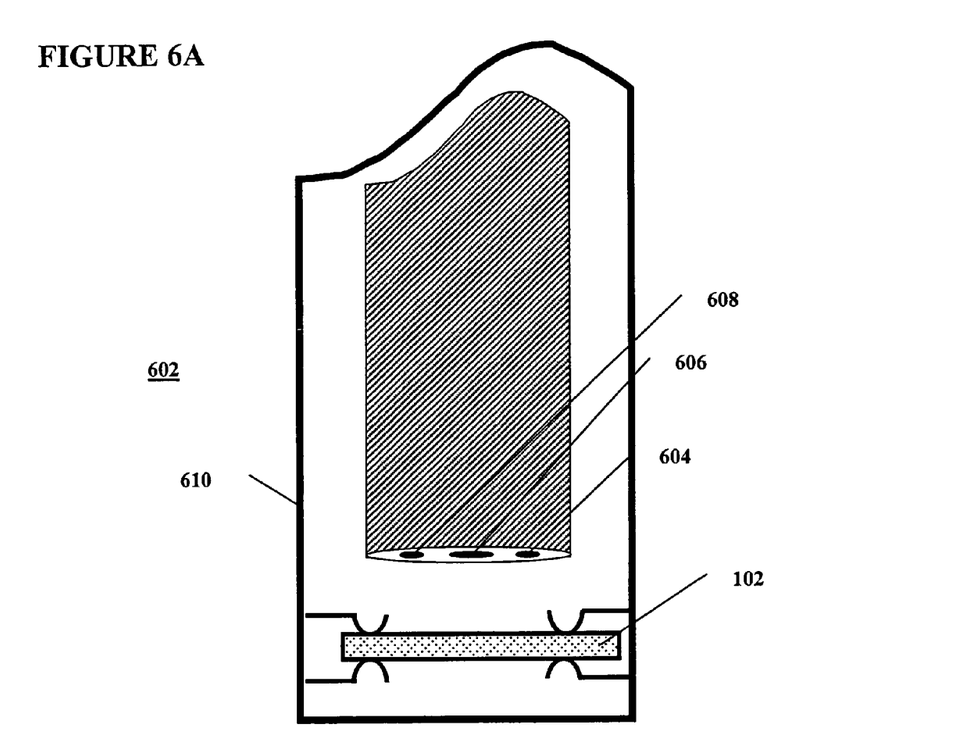
Figure 6B:
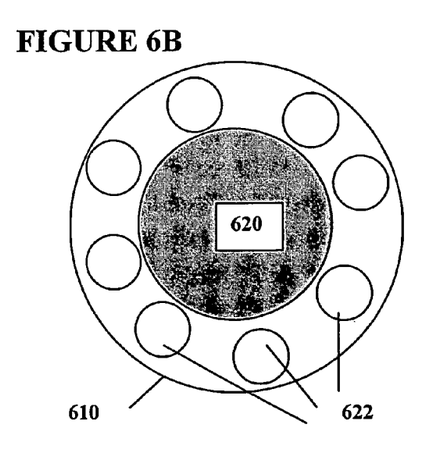
Figure 6C:
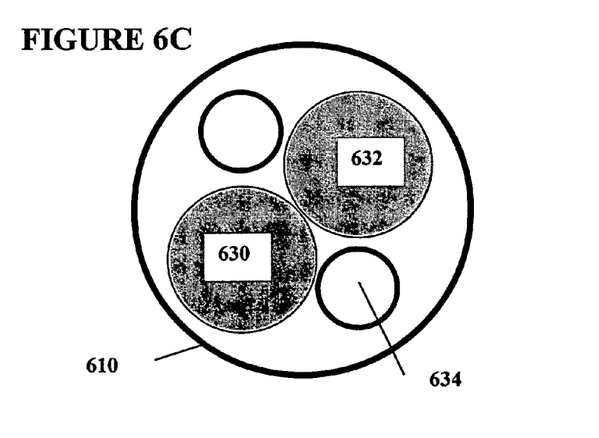

FIG. 6 illustrates an alternative embodiment of the TLD system of the present invention for in vivo radiation monitoring of radiation doses in a patient undergoing radiation therapy. The effectiveness of radiation treatment can be improved by monitoring radiation doses in patients undergoing radiation therapy. It is desirable to introduce a radiation dosimeter inside the portion of the body that is exposed to radiation (e.g. a malignant tumor). Such a dosimeter, if operated in real time, can help the physician determined what dose was applied to this portion of the body during irradiation. FIG. 6A shows a TLD system 602 having three fibers (exemplarily the fibers described in FIG. 3) 604, 606 and 608 inserted inside a hypodermic needle or a catheter 610. A TLD element 102 is held in a mechanical holder, exemplarily the holder of FIG. 2A, in front of the distal ends of the fibers. Alternative arrangements are shown in FIGS. 6B and C. FIG. 6B shows one infrared fiber 620, which transmits the laser beam to the TLD element and also transmits the thermal infrared radiation from the TLD element to the IR detector. An array of visible fibers 622 transmits the TL from the heated TLD element to the photodetector. FIG. 6C shows one fiber 630 for transmitting the laser beam onto the TLD element and another fiber 632 for transmitting the thermal IR radiation from the TLD element to the infrared detector. Two other fibers 634 transmit the thermoluminescence from the heated TLD element to the photodetector. The needle may be inserted, for example, into a tumor, and the TLD element in the needle exposed to radiation. At the end of the treatment, the laser controlled TLD system will operate much the same way as discussed earlier. This will provide the physician with the radiation dose. At the end of the laser heating, the TLD element(s) can be used again. The physician can decide, at this stage, whether to stop the radiation or to continue with the therapy. In some embodiments, a second, third, or more doses can be read in real time if needed. Further, if needed, the system can also perform the annealing step between consecutive dose measurements. The system of the present invention thus allows precise control of radiation doses, reduces the damage to healthy tissues, and increases the effectiveness of the therapeutic method.

In alternative embodiments, a larger tube may replace the needle or catheter 610 described above, possibly to carry out radiation dosimetry in any remote location, such as needed for environmental monitoring. The tube may be rigid or flexible, and its dimensions and shape may vary.

APPLICATION EXAMPLE

Figure 7:
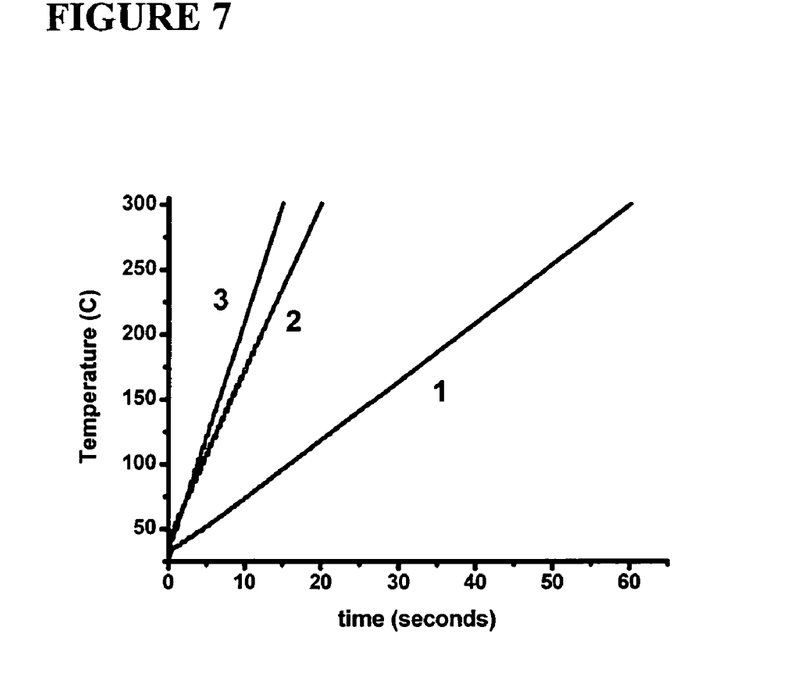
FIG. 7 shows the time dependence of the temperature $T_{el}$ of a commercial TLD element TLD-100 heated by a $CO_2$ laser. The temperature dependence is linear for three different heating rates, marked 1, 2 and 3.

The TLD system of FIG. 3B (fiber directed radiation) was used in measurements that illustrate the applicability and performance of the method described herein. The controlled heating process in each measurement was programmed to a linear scheme from $T_0=30°$ C. to $T=300°$ C., for three different heating periods: 15, 20, and 60 seconds. Therefore, three different heating rates were employed, from $\alpha=4.5$ degrees/sec to $\alpha=18$ degrees/sec. The TLD element (a standard TLD-100 3×3 mm chip manufactured by Thermo—Harshaw, Oakwood Village, Ohio, USA) was heated by a $CO_2$ laser (Model J-48-2, Synrad, Mukilteo, Wash., USA) whose radiation ($\lambda=10.6$ μm) is highly absorbed by most materials. This mid-IR radiation cannot be transmitted through standard silica based optical fibers, but it can be easily transmitted through silver halide (e.g. AgClBr) fibers. The radiation of a $CO_2$ laser was transmitted through one silver halide fiber to heat a spot on the surface of the TLD element. A second silver-halide fiber was used to transmit the thermal IR radiation emitted from the TLD element surface to a liquid nitrogen cooled photonic HgCdTe detector (IR Associates, Stuart, Fla., USA), which was part of a fiber-optic infrared radiometer. The second fiber also served as a filter that blocked the visible part of the radiation to the IR detector. FIG. 7 shows the time dependence of the temperature of the TLD element for the various heating rates. The figure clearly shows that the temperature dependence is linear for all three heating rates, i.e. the TLD element "temperature control" in achieving a linear heating scheme for each heating rate.

Figure 8:
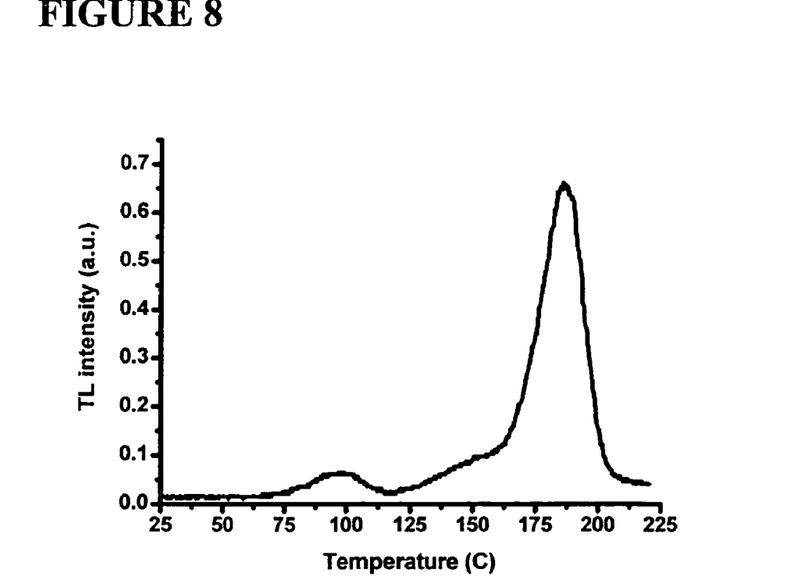
FIG. 8 shows the TL signal vs. temperature of a TLD-100 element for $\alpha=4.3$ degrees/sec (marked 1 in FIG. 7).

FIG. 8 shows the TL signal vs. temperature of the Harshaw TLD-100 element for $\alpha=4.3$ degrees/sec. Both the height of the peak at roughly 180° C. and the integrated area under the glow curve were proportional to the dose to which the TLD element had been exposed. Therefore the system can be used for thermoluminescence dosimetry.

In summary, the present invention advantageously provides a TLD measurement system and method in which the temperature and heating rate of each TLD element is known and controllable in real-time. The control is based on real time temperature inputs obtained from IR measurements of the TLD temperature. The invention allows therefore to obtain optimized heating rates (i.e. linear) that ensure acquisition of more reproducible and accurate dosimetry results than known in prior art.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. Many modifications and variations of the present invention are possible in light of the above teachings. It is therefore to be understood that, within the scope of the claims, the invention may be practiced otherwise than as specifically described.

What is claimed is:

1. A thermoluminescence-based dosimetry system comprising:
 (a) at least one thermoluminescent dosimetry (TLD) element operative to be heated controllably and to emit luminescence during the heating, the emitted luminescence correlated with a radiation dose to which the TLD element has been exposed; and
 (b) an infrared (IR) radiometry subsystem for monitoring and controlling a heating rate of each TLD element during the heating and for providing respective IR radiation inputs used in the controllable heating.

2. The system of claim 1, further comprising:
 (c) a heating subsystem for providing the controllable heating rate of each TLD element;
 (d) a thermoluminescence (TL) measuring subsystem for measuring the emitted luminescence, and for providing luminescence data; and
 (e) a control subsystem for controlling heating parameters of the heating subsystem in response to the IR radiation inputs and for providing at least one glow curve based on the luminescence data, the glow curve indicative of the radiation dose.

3. The TLD system of claim 1 wherein the IR radiometry subsystem includes at least one IR detector.

4. The TLD system of claim 3, wherein the at least one IR detector is selected from the group consisting of a thermal detector and a photonic detector.

5. The TLD system of claim 2, wherein the heating system includes a laser having a laser beam.

6. The TLD system of claim 5, wherein the heating system further includes at least one optical fiber coupled to the laser and operative to transmit the laser beam to each TLD element.

7. The TLD system of claim 3, wherein the IR radiometry subsystem further includes an IR-transparent optical fiber for coupling the IR detector to each TLD element along an optical path.

8. The TLD system of claim 7, wherein the IR radiometry subsystem further includes a filter that transmits IR radiation but blocks NIR, visible and UV radiation, the filter inserted in the optical path.

9. The TLD system of claim 8, wherein the TL measuring subsystem includes an optical fiber transparent to the luminescence and coupled to the TLD element along an optical path and a filter that transparent to the luminescence and opaque to IR radiation, the filter inserted in the optical path.

10. The TLD system of claim 2, wherein each of the heating, IR radiometry and TL measuring subsystems includes at least one respective optical fiber for coupling respective radiation into or out of the at least one TLD element along respective optical paths.

11. The TLD system of claim 10, wherein all the respective optical fibers are bundled in one enclosure, selected from the group consisting of a hypodermic needle, a catheter and a tube.

12. The TLD system of claim 5, wherein the laser is selected from the group consisting of a pulsed laser, continuous wave gas laser, solid-state laser and semiconductor laser.

13. A thermoluminescence (TL)-based dosimetry system comprising:
   (a) at least one thermoluminescent dosimetry (TLD) element operative to be heated at a controlled heating rate and to emit luminescence during the heating;
   (b) a laser for effecting the heating;
   (c) an infrared (IR) radiometry subsystem for monitoring the heating rate of each TLD element during the heating and for providing respective IR radiation inputs used in the controlled heating rate.

14. The TLD system of claim 13, further comprising:
   (d) TL detector for obtaining luminescence readings, the luminescence readings correlated with a radiation dose to which the element has been exposed; and
   (e) a controller for controlling the laser based on the IR radiation inputs, thereby facilitating the controllable heating of each TLD element.

15. The TLD system of claim 14, wherein the laser, the IR detector and the TL detector are optically coupled to each TLD element through at least one respective optical fiber.

16. A method for performing thermoluminecence (TL)-based dosimetry comprising the steps of:
   (a) exposing a thermoluminescence dosimetry (TLD) element to an unknown dose of radiation,
   (b) heating the TLD element at a controlled rate based on real-time temperature inputs from the TLD element;
   (c) performing TL measurements on the heated TLD element to obtain a glow curve; and
   (d) analyzing the glow curve to determine the radiation dose to which the TLD element was exposed.

17. The method of claim 16, wherein the step of exposing is preceded by a step of annealing the TLD element at a high temperature to erase any memory from previous measurements.

18. The method of claim 16, wherein the step of heating a TLD element at a controlled rate includes obtaining infrared (IR) temperature readings from the TLD element, the IR readings serving as the real-time temperature inputs.

19. The method of claim 16, wherein the step of heating includes heating using a laser.

20. The method of claim 18, wherein the heating using a laser, the step of performing TL measurements and the obtaining of IR temperature readings includes using respective optical fibers to respectively transmit laser radiation, TL emission radiation and IR radiation, thereby allowing remote TL-based dosimetry.

21. The method of claim 20, wherein the using of respective optical includes bundling the optical fibers in an enclosure.

22. A thermoluminescence-based dosimetry system comprising:
   (a) at least one thermoluminescent dosimetry (TLD) element operative to be heated controllably and to emit luminescence during the heating, the emitted luminescence correlated with a radiation dose to which the TLD element has been exposed; and
   (b) an infrared (IR) radiometry subsystem for monitoring IR radiation emitted from each TLD element during the heating and for providing respective IR radiation inputs used in the controllable heating, wherein the IR radiometry subsystem includes:
      (i) at least one IR detector;
      (ii) an IR-transparent optical fiber for coupling the IR detector to each TLD element along an optical path, and
      (iii) a filter that transmits IR radiation but blocks NIR, visible and UV radiation, the filter inserted in the optical path.

23. The TLD system of claim 22, wherein the TL measuring subsystem includes an optical fiber transparent to the luminescence and coupled to the TLD element along an optical path and a filter transparent to the luminescence and opaque to IR radiation, the filter inserted in the optical path.

* * * * *

UNITED STATES PATENT AND TRADEMARK OFFICE
CERTIFICATE OF CORRECTION

PATENT NO. : 7,439,524 B2
APPLICATION NO. : 11/214735
DATED : October 21, 2008
INVENTOR(S) : Abraham Katzir and Ofer Gayer It is certified that error appears in the above-identified patent and that said Letters Patent is hereby corrected as shown below:

Title Page, Item (54) should be corrected as follows:
change
--Thermoluminescence Measurements and Dosimetry with Temperature Control of the Thermoluminescence Element--
to
"Thermoluminescence Measurements and Dosimetry with Temperature Control of the Thermoluminescent Element"

Claim 14, column 13 should be corrected as follows:

Line 19: after (d), add "a".

Signed and Sealed this

Twenty-third Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,439,524 B2
APPLICATION NO. : 11/214735
DATED : October 21, 2008
INVENTOR(S) : Abraham Katzir and Ofer Gayer It is certified that error appears in the above-identified patent and that said Letters Patent is hereby corrected as shown below:

Front page

Title (54) should be corrected as follows:
change
--Thermoluminescence Measurements and Dosimetry with Temperature Control of the Thermoluminescence Element-- to

"Thermoluminescence Measurements and Dosimetry with Temperature Control of the Thermoluminescent Element"

Front Page

Assignee (73) should be corrected as follows:
change
--Abraham Katzir, Tel Aviv (IL); Ofer Gayer, Tel Aviv (IL)-- to

"Abraham Katzir, Tel Aviv (IL)"

Claim 14, column 13 should be corrected as follows:

Line 19: after (d), add "a".

Signed and Sealed this

Thirteenth Day of January, 2009

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,439,524 B2 | Page 1 of 1 |
| APPLICATION NO. | : 11/214735 | |
| DATED | : October 21, 2008 | |
| INVENTOR(S) | : Abraham Katzir and Ofer Gayer | |

It is certified that error appears in the above-identified patent and that said Letters Patent is hereby corrected as shown below:

Title Page, Item (54) and Column 1, lines 1-4, should be corrected as follows:
change
--Thermoluminescence Measurements and Dosimetry with Temperature Control of the Thermoluminescence Element--
to
"Thermoluminescence Measurements and Dosimetry with Temperature Control of the Thermoluminescent Element"

Claim 14, column 13 should be corrected as follows:

Line 19: after (d), add "a".

This certificate supersedes the Certificate of Correction issued December 23, 2008.

Signed and Sealed this

Twenty-seventh Day of January, 2009

JOHN DOLL
*Acting Director of the United States Patent and Trademark Office*

UNITED STATES PATENT AND TRADEMARK OFFICE
CERTIFICATE OF CORRECTION

PATENT NO.          : 7,439,524 B2
APPLICATION NO.  : 11/214735
DATED                 : October 21, 2008
INVENTOR(S)        : Abraham Katzir et al.

Page 1 of 1

It is certified that error appears in the above-identified patent and that said Letters Patent is hereby corrected as shown below:

This certificate vacates the Certificate of Correction issued January 13, 2009. The certificate is a duplicate of the Certificate of Correction issued January 27, 2009. All requested changes were included in the Certificate of Correction issued January 27, 2009.

Signed and Sealed this

Seventeenth Day of February, 2009

JOHN DOLL
*Acting Director of the United States Patent and Trademark Office*